United States Patent
Kanazawa et al.

(10) Patent No.: US 10,961,161 B2
(45) Date of Patent: Mar. 30, 2021

(54) PRODUCTION METHOD OF CERAMIC MATRIX COMPOSITE

(71) Applicant: IHI Corporation, Koto-ku (JP)

(72) Inventors: Shingo Kanazawa, Tokyo (JP); Akihiro Sato, Tokyo (JP); Yousuke Mizokami, Tokyo (JP); Takeshi Nakamura, Tokyo (JP); Ryoji Kakiuchi, Tokyo (JP); Yuuya Nagami, Tokyo (JP)

(73) Assignee: IHI Corporation, Koto-ku (JP)

(*) Notice: Subject to any disclaimer, the term of this patent is extended or adjusted under 35 U.S.C. 154(b) by 0 days.

(21) Appl. No.: 16/242,031

(22) Filed: Jan. 8, 2019

(65) Prior Publication Data

US 2020/0024199 A1    Jan. 23, 2020

Related U.S. Application Data

(63) Continuation of application No. PCT/JP2017/019862, filed on May 29, 2017.

(30) Foreign Application Priority Data

Sep. 6, 2016 (JP) .................. JP2016-173455

(51) Int. Cl.
*C04B 35/80* (2006.01)
*C04B 35/565* (2006.01)

(52) U.S. Cl.
CPC .......... *C04B 35/806* (2013.01); *C04B 35/565* (2013.01); *C04B 2235/3826* (2013.01)

(58) Field of Classification Search
CPC ..... C04B 35/806; C04B 35/565; C04B 35/80; C04B 2235/3826; C04B 41/85; C04B 41/88; C22C 1/10
See application file for complete search history.

(56) References Cited

U.S. PATENT DOCUMENTS

| 4,124,401 A | * | 11/1978 | Lee ..................... C04B 35/6316 501/90 |
| 5,955,391 A | * | 9/1999 | Kameda ................ C04B 35/573 204/192.28 |
| 5,990,025 A | | 11/1999 | Suyama et al. |

(Continued)

FOREIGN PATENT DOCUMENTS

| CN | 1810727 | 8/2006 |
| CN | 101528636 | 9/2009 |

(Continued)

OTHER PUBLICATIONS

Office Action dated Sep. 17, 2019 in corresponding Japanese Patent Application No. 2018-538025, 2 pages.

(Continued)

*Primary Examiner* — Noah S Wiese
(74) *Attorney, Agent, or Firm* — Oblon, McClelland, Maier & Neustadt, L.L.P.

(57) ABSTRACT

A production method of a ceramic matrix composite is consisted of: forming a ceramic compact including one or more of a reinforcement fiber and a powder, each including SiC; attaching an ingot of a ternary or more multicomponent Si alloy including Y onto the ceramic compact; and infiltrating the alloy into the ceramic compact by heating up to a temperature at which the alloy melts.

5 Claims, 4 Drawing Sheets

(56) References Cited

U.S. PATENT DOCUMENTS

| | | | |
|---|---|---|---|
| 8,980,027 B2 | 3/2015 | Eberlingfux | |
| 2005/0244581 A1 | 11/2005 | Thebault et al. | |
| 2006/0157884 A1* | 7/2006 | Ludtke | C22C 21/02 |
| | | | 264/122 |
| 2006/0163773 A1 | 7/2006 | Edward | |
| 2009/0256112 A1 | 10/2009 | Shimada et al. | |
| 2009/0295048 A1 | 12/2009 | Matsumoto et al. | |
| 2010/0009143 A1 | 1/2010 | Pailler | |
| 2013/0184141 A1* | 7/2013 | Ogasawara | C04B 35/62884 |
| | | | 501/91 |
| 2013/0287941 A1 | 10/2013 | Edward | |
| 2016/0102022 A1* | 4/2016 | Chamberlain | C04B 35/565 |
| | | | 423/263 |
| 2016/0145158 A1 | 5/2016 | Ogasawara et al. | |
| 2016/0214907 A1* | 7/2016 | Shim | C04B 41/4511 |
| 2016/0368827 A1* | 12/2016 | Landwehr | C04B 35/565 |
| 2017/0044069 A1* | 2/2017 | Harris | C04B 35/64 |
| 2020/0024198 A1* | 1/2020 | Sato | C04B 35/62863 |

FOREIGN PATENT DOCUMENTS

| | | |
|---|---|---|
| CN | 103373858 | 10/2013 |
| EP | 1 676 824 A1 | 7/2006 |
| JP | 61-044775 | 3/1986 |
| JP | 10-152378 | 6/1998 |
| JP | 2002-293673 | 10/2002 |
| JP | 2005-320236 | 11/2005 |
| JP | 2006-265080 | 10/2006 |
| JP | 2010-202488 | 9/2010 |
| JP | 2013-147366 | 8/2013 |
| RU | 2 193 544 C2 | 11/2002 |
| RU | 2 567 582 C1 | 11/2015 |
| WO | WO 2014/149757 A1 | 9/2014 |

OTHER PUBLICATIONS

Combined Office Action and Search Report dated Dec. 4, 2019 in Russian Patent Application No. 2019109450, 15 pages (with English translation).

International Search Report dated Jul. 4, 2017 in PCT/JP2017/019862, filed May 29, 2017 (with English Translation).

Written Opinion dated Jul. 4, 2017 in PCT/JP2017/019862, filed May 29, 2017.

Office Action as received in the corresponding Chinese application No. 201780040385.6 dated Dec. 16, 2020 (5 pages).

* cited by examiner

PRODUCTION METHOD OF CERAMIC MATRIX COMPOSITE

CROSS-REFERENCE TO RELATED APPLICATIONS

This application is a Continuation Application of PCT International Application No. PCT/JP2017/019862 (filed May 29, 2017), which is in turn based upon and claims the benefit of priority from Japanese Patent Application No. 2016-173455 (filed Sep. 6, 2016), the entire contents of which are incorporated herein by reference.

BACKGROUND

Technical Field

The disclosure herein relates to a production method for a ceramic matrix composite applied to devices requiring high-temperature strength, such as aircraft jet engines.

Related Art

Ceramics have excellent heat resistance but at the same time many of them have a drawback of brittleness. Many attempts to combine fibers of a ceramic with a matrix of another ceramic or a metal have been studied in order to overcome the brittleness.

As a process for combining, proposed are methods of chemical vapor infiltration (CVI), liquid phase infiltration (such as polymer infiltration pyrolysis (PIP)), solid phase infiltration (SPI), and molten metal infiltration (MI) for example. According to the MI method for example, an ingot of a metal from which the matrix is originated is attached onto a fabric of fibers such as SiC and the combination is melted, thereby combining the matrix with this reinforcing fibers.

Combined arts in which some of these methods are combined have been proposed. Japanese Patent Application Laid-open No. 2013-147366 discloses a related art.

SUMMARY

The MI method, as inherently reinforcement fibers are exposed to high temperatures in this method, sometimes causes the reinforcement fibers to deteriorate to an unignorable extent. Considering that silicon (Si) is to be melted and infiltrated, the reinforcement fibers should be exposed to high temperatures at least higher than the melting point for the purpose of melting and infiltration, while the melting point of Si is 1414 degrees C. In addition, such high temperatures would put a considerable load on a reaction furnace.

The production method disclosed below has been created in the aforementioned problems. According to an aspect, a production method of a ceramic matrix composite is consisted of: forming a ceramic compact including one or more of a reinforcement fiber and a powder, each including SiC; attaching an ingot of a ternary or more multicomponent Si alloy including Y onto the ceramic compact; and infiltrating the alloy into the ceramic compact by heating up to a temperature at which the alloy melts.

Preferably, the Si alloy includes: 2 at % or more and 30 at % or less Y; and 2 at % or more and 15 at % or less Ti or Hf. Alternatively, the Si alloy consists of: 2 at % or more and 30 at % or less Y; 2 at % or more and 15 at % or less Ti or Hf; and unavoidable impurities and a balance Si. Alternatively preferably, in the Si alloy, the content of Y is in a range of from 2 at % to 6 at %. Still preferably, in the Si alloy, the content of Ti is in a range of from 6 at % to 10 at %. More preferably, the production method further includes, prior to the step of attaching the ingot, infiltrating a powder of any one or more of SiC and C into the ceramic compact.

Advantageous Effects

Deterioration of the reinforcement fibers by high temperatures in the step of melting could be prevented.

DESCRIPTION OF EMBODIMENTS

Exemplary embodiments will be described hereinafter with reference to the appended drawings.

Preferably applicable uses of ceramic matrix composites according to the embodiments are any machinery components exposed to high-temperature environments, such as components used for aeronautic jet engines, and its examples are turbine blades, combustors, after-burners and such. Of course any other uses are possible.

A ceramic matrix composite according to an embodiment is produced generally by forming a ceramic compact consisting of one or more of reinforcement fibers and powder of a ceramic such as silicon carbide (SiC) and melting and infiltrating a silicon (Si) alloy of a ternary or more multicomponent Si alloy into the ceramic compact. The matrix, in which the Si alloy is infiltrated, combines the SiC fabric and/or the powder together, thereby forming the ceramic matrix composite. Further, to form the matrix, any one or more of chemical vapor infiltration (CVI), liquid phase infiltration (such as polymer infiltration pyrolysis (PIP)) and solid phase infiltration (SPI) can be combined thereto.

Figure 1:
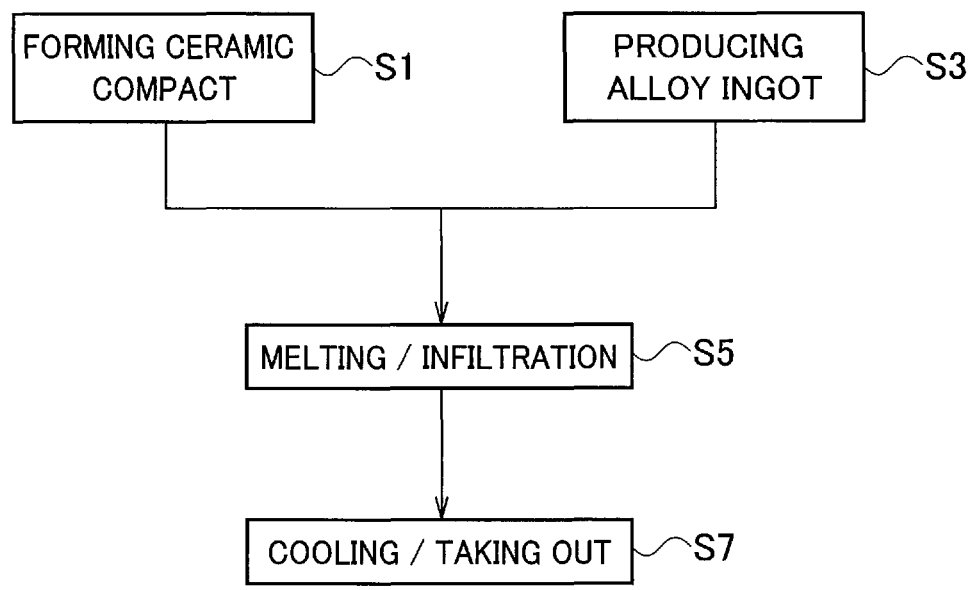
FIG. 1 is a flowchart generally describing a production method of a ceramic matrix composite according to an embodiment.

A production method of the ceramic matrix composite will be described hereafter mainly with reference to FIG. 1. First, a ceramic compact is formed in a predetermined shape that is determined in accordance with its use (Step S1). The reinforcement fibers of the ceramic may be left as a bundle of the fibers but may be in advance woven into a fabric, and further may be in advance subject to infiltration of the ceramic powder. An example for the ceramic is SiC but carbon (C), boron nitride (BN) or any other proper ceramic is still applicable and any mixture thereof may be also applied thereto. The reinforcement fibers and the powder may be of a common ceramic or alternatively of distinct ceramics respectively. Further the fabric may be either two-dimensionally woven or three-dimensionally woven.

The reinforcement fibers may be processed with coating. C and BN can be exemplified as the coating layer but are not limiting. Any publicly known production method such as vapor deposition methods and dip methods may be applicable to its production. Further the coating may be deposited before or after the step of forming. The interface coating prevents crack propagation from the matrix to the fibers and increases toughness.

In a case where the ceramic compact is produced generally from ceramic powder, the powder may be in advance press-formed and pre-sintered.

Regardless of whether the ceramic compact is formed of the reinforcement fibers including the ceramic powder or generally of the ceramic powder, it may contain a second ceramic powder distinctive therefrom. It may for instance contain C powder further. The C powder can react with the molten Si alloy to produce SiC, which contributes improvement of strength of the ceramic matrix composite.

In parallel with formation of the ceramic compact, an ingot to be melted and infiltrated therein is produced (Step S3). The alloy is for instance a ternary Si alloy such as an yttrium (Y)-titanium (Ti)—Si alloy. As described already, a three or more multi component Si alloy is instead applicable.

In these Si alloys, alloying with solutes causes melting-point depression and therefore the melting points are lower than that of pure Si (1414 degrees C.). On the other hand, while many reinforcement fibers will rapidly deteriorate at 1400 degrees or higher, this deterioration is sensitive to temperature because it is based on chemical reactions that conform the Arrhenius equation. Slight temperature depression around 1400 degrees C. will prominently decelerate the deterioration speed. Specifically, the melting-point depression by alloying is available for suppressing deterioration of the reinforcement fibers.

As compared with addition of a single element to Si, adding plural elements in combination is more preferable. In a case of adding Ti alone for instance, adding 15 at % Ti to Si depresses the melting point just only down to 1330 degrees C. This composition is a so-called eutectic composition in the Si—Ti system and 1330 degrees C. is a so-called eutectic point as the lowest melting point in this system. If Si is, in the process of infiltration, exhausted in the carbonizing reaction and the composition in the molten metal is deviated from the eutectic composition toward the Ti-rich side, the melting point increases and then progress of infiltration will be barred anymore. When Y in combination with Ti is added at 2 at % for instance, this phenomenon is effectively prevented and sufficient infiltration can be expected. As excessive addition of Y rather increases the melting point, it is preferably 30 at % or less, or more preferably 18 at %, which is the eutectic composition, or less.

On the other hand, according to studies by the present inventors, addition of Y seems disadvantageous in light of oxidation resistance of the ceramic matrix composite, while addition of Ti or Hf seems preferable in improvement of the oxidation resistance. Thus it is rational to add a relatively small amount of Y along with Ti or Hf in light of improvement of both the infiltration ability and the oxidation resistance. As described above, to the ingot preferably applicable is a ternary or more multicomponent Si alloy including Y, such as a multicomponent Si alloy including Y and Ti for instance.

Figure 2A:
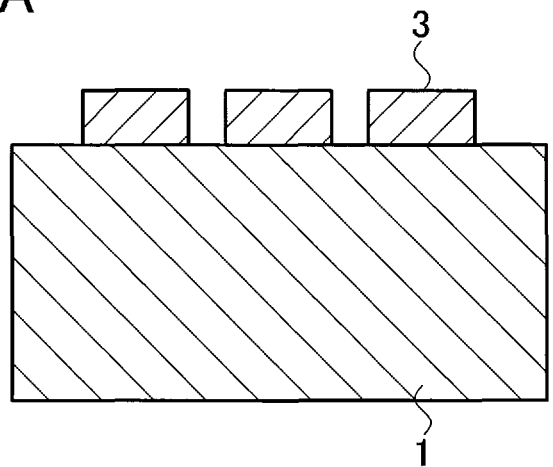
FIG. 2A is a sectional view schematically depicting a state where an ingot is attached onto a compact in a step of melting.

More specifically, in the step S3, an ingot preferably of a ternary or more multicomponent Si alloy is produced. The ingot is formed in a proper shape and dimensions so designed with a shape of the ceramic compact to be attached in mind. Referring to FIG. 2A, the produced ingot 3 is attached to the ceramic compact 1 and inserted into a reaction furnace. Preferably the furnace is evacuated down to a vacuum or purged by introduced inert gas such as argon.

Referring again to FIG. 1, to melt and infiltrate the ingot 3 into the ceramic compact 1 (step S5), the ceramic compact 1 and the ingot 3 is heated in the furnace.

A temperature profile in the step of heating can be exemplified by the following description for instance. A rate of temperature increase is 10 degrees C./min for instance while it may be properly selected. In the process of temperature increase, the step may contain a step of temporarily halting the temperature increase and retaining the temperature. Further, before reaching a maximum temperature Tmax in heating, the rate of temperature increase may be suppressed down to 5 degrees C./min for instance.

The maximum temperature Tmax in heating should be selected to be a proper temperature that is high enough to melt the ternary or more multicomponent Si alloy according to its composition but is capable of preventing the reinforcement fibers from deterioration. Tmax may be determined to be 1395 degrees C. for example, or properly determined as a value relative to the melting point, such as the melting point plus 20 degrees C.

Figure 2B:
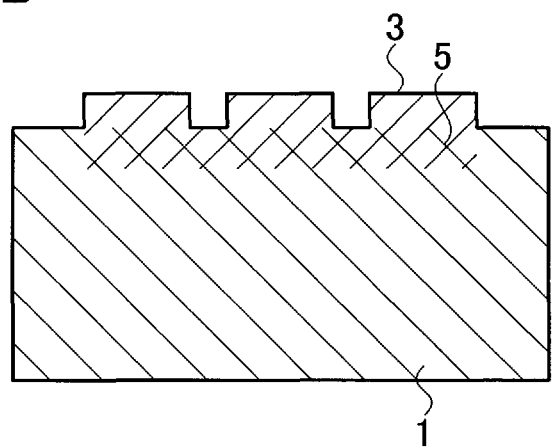
FIG. 2B is a sectional view schematically depicting a state where the ingot is infiltrated into the compact in the step of melting.
Figure 2C:
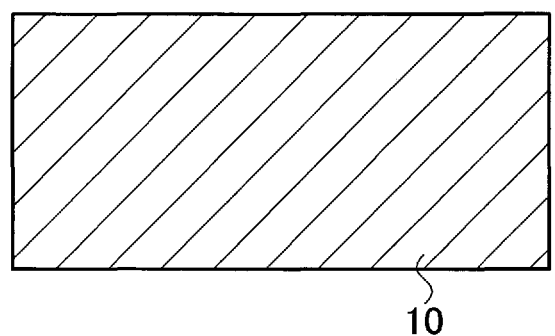
FIG. 2C is a sectional view schematically depicting a state where the ingot finishes being infiltrated into the compact in the step of melting.

When reaching the melting point, as schematically shown in FIG. 2B, the ingot 3 starts melting and gradually infiltrating into the ceramic compact 1 as shown by the reference sign 5. This process would finish in a relatively short time and, as schematically shown in FIG. 2C, provides a ceramic matrix composite 10 in which the alloy infiltrates throughout its structure.

To cause sufficient infiltration, duration of the maximum temperature is preferably made longer. Extremely long duration, however, causes deterioration of the reinforcement fibers. Therefore the duration time should be limited to be properly short. These factors can be taken into consideration to determine the duration time.

The ceramic matrix composite 10, thereafter, is gradually cooled and then taken out of the furnace (Step S7). To avoid abrupt thermal shock, any proper cooling rate may be set.

The obtained ceramic matrix composite would be usually subject to finishing, thereby providing a final product. Or, still after finishing, the product may be subject to coating for the purpose of preventing adhesion of foreign substances or any other purpose.

To verify effects by the present embodiment, some tests have been carried out.

Some ceramic compacts, which were fabrics of SiC fibers with SiC powders infiltrating therein by the solid phase infiltration method respectively, were prepared, and ingots having composites listed in Table 1 were respectively prepared.

TABLE 1

| Ingots subject to the test | | | |
|---|---|---|---|
| | Composition (at %) | | |
| Test Piece | Y | Ti | other |
| A | — | 10 | bal. Si |
| B | — | 15 | bal. Si |
| C | 10 | — | bal. Si |
| D | 18 | — | bal. Si |
| E | — | — | 9.2 at % Hf-bal. Si |

TABLE 1-continued

Ingots subject to the test

| | Composition (at %) | | |
|---|---|---|---|
| Test Piece | Y | Ti | other |
| F | 2 | 6 | bal. Si |
| G | 2 | 10 | bal. Si |
| H | 2 | 15 | bal. Si |
| I | 4 | 6 | bal. Si |
| J | 4.3 | 9.7 | bal. Si |
| K | 4.8 | 7.8 | bal. Si |
| L | 6 | 4 | bal. Si |
| M | 6 | 10 | bal. Si |
| N | 6 | 15 | bal. Si |
| O | 8.8 | 2.1 | bal. Si |

The ingots were respectively combined with the aforementioned ceramic compacts and heated in a vacuum to cause melting and infiltration. Its temperature profile conformed with that described already. Tmax of them aside from the test piece D were 1395 degrees C. and that of test piece D was 1250 degrees C.

The obtained ceramic matrix composites were respectively cut and polished on the sectional surfaces, and were subject to sectional observation using a scanning electron microscope (SEM).

In the test piece B (Si-15 at % Ti) and the test piece E (Si-9.2 at % Hf), voids were clearly observed on these sectional surfaces and more specifically it is clear that infiltration of Si was insufficient. In the test piece C (Si-10 at % Y), however, voids were not clearly observed. Further, in the test pieces F through O (ternary alloys), prominent voids were not observed. More specifically, it is clear that the Y—Si alloy and the ternary Si alloys including Y are superior in infiltration ability.

Figure 3:
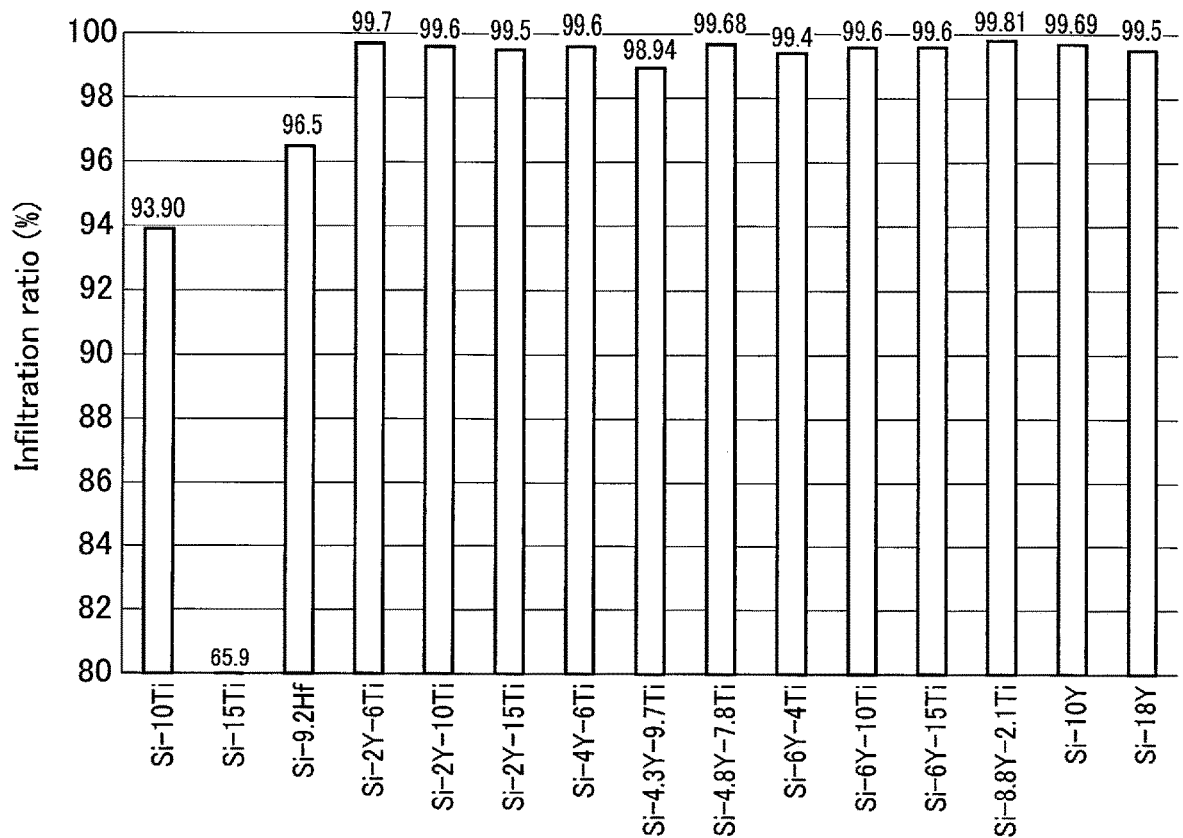
FIG. 3 is a graph showing an influence of a composition of the ingot on a ratio of infiltration.

Using image analysis, voids were discriminated from the other on the sectional surfaces and these areas were measured. Infiltration ratios were calculated in regard to the respective test pieces, where an infiltration ratio is defined as (the total area–the area of the gaps)/the total area×100%. Results are summarized in FIG. 3.

The test pieces F through O (ternary Si alloys) and the test piece C are found to have higher infiltration ratios as compared with the test pieces B, E (binary Si alloys). It could be recognized that combined addition depresses melting points as described earlier and as well improves the infiltration ability. At least in a condition that Ti is added in combination, 2 at % or more Y addition is effective for suppressing defects in ceramic matrix composites.

Analysis on the sectional surfaces by using EPMA was carried out. Probe diameters were 30 micrometers Φ and measurements on randomly selected 25 points were respectively carried out. Compositions on 24 points, as 1 point being excluded, were averaged respectively and the results are listed in Table 2.

TABLE 2

Results of composition analysis by EPMA

| | Composition (at %) | | | | |
|---|---|---|---|---|---|
| Test Piece | C | Si | O | Y | Ti |
| C | 32.17 | 64.23 | 0.53 | 3.07 | — |
| D | 32.08 | 59.08 | 1.26 | 7.58 | — |
| F | 31.55 | 64.12 | 0.26 | 1.56 | 2.51 |
| G | 30.68 | 64.60 | 0.30 | 0.81 | 3.80 |
| H | 28.78 | 63.77 | 0.31 | 0.91 | 6.23 |
| I | 28.77 | 66.68 | 0.50 | 1.19 | 2.85 |
| J | 30.03 | 65.08 | 0.55 | 1.44 | 2.90 |
| K | 30.82 | 63.65 | 0.44 | 1.20 | 3.89 |
| L | 30.41 | 66.47 | 0.26 | 1.70 | 1.17 |
| M | 30.55 | 62.36 | 1.21 | 2.30 | 3.58 |
| N | 29.65 | 59.66 | 1.12 | 2.96 | 6.62 |
| O | 31.90 | 64.44 | 0.62 | 2.48 | 0.56 |

The respective test pieces were further subject to exposure tests in which test pieces were exposed to the air at 1100 degrees C. for 100 hours and thickness reductions by oxidation were measured. The thickness reductions are divided by the exposure time to get oxidation ratios, which are summarized in FIG. 4.

Figure 4:
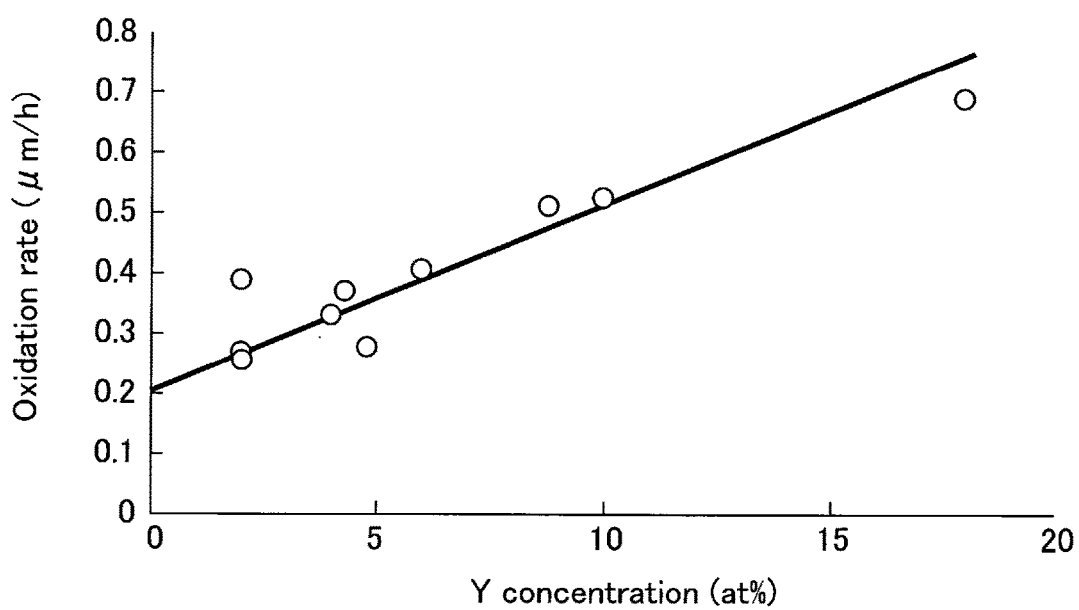
FIG. 4 is a graph showing an influence of an yttrium content in the ingot on oxidation resistance.

As the Y concentration is put on the horizontal axis, FIG. 4 shows influence of the Y concentration on oxidation resistance. It is acknowledged that the oxidation rate has a positive slope with respect to the Y concentration. Specifically, at least in a condition of combined addition with Ti, addition of Y is disadvantageous in light of oxidation resistance of ceramic matrix composites, and in particular 6 at % or less Y addition is preferable.

Further, the respective test pieces were machined into rectangular test pieces having dimensions of 50 (length)×10 (width)×2 (thickness) mm, and Young's moduli were respectively measured on the basis of a resonance method. Results are shown in FIG. 5.

Figure 5:
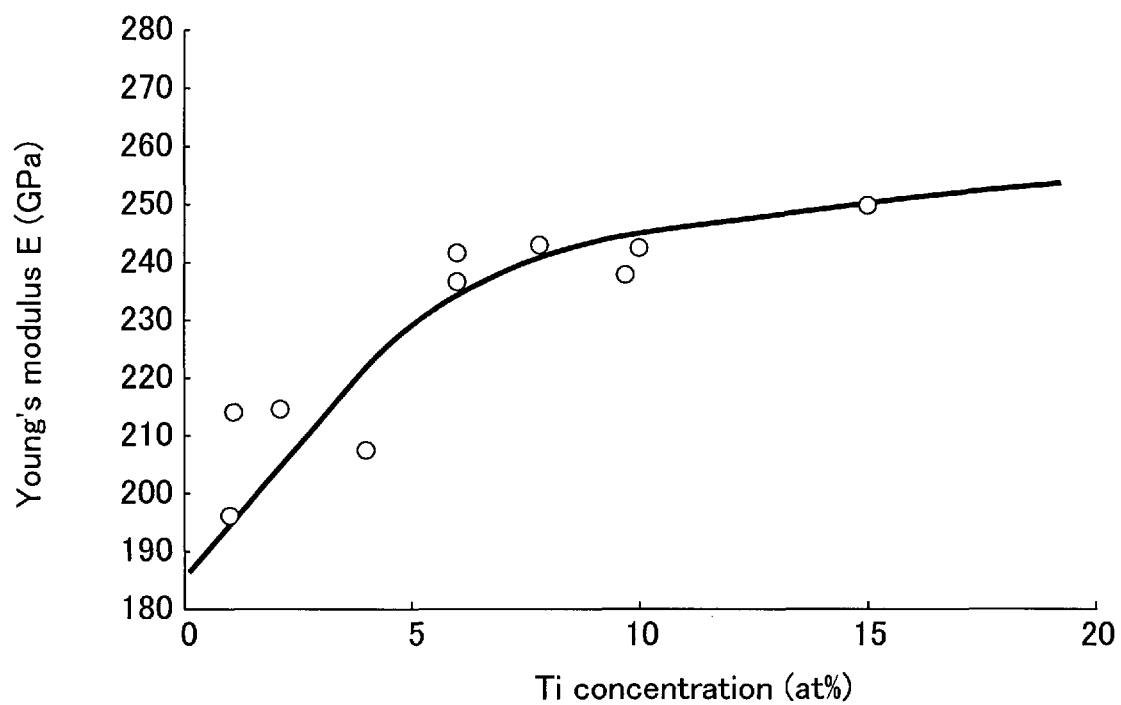
FIG. 5 is a graph showing an influence of a titanium content in the ingot on the Young's modulus.

As the Ti concentration is put on the horizontal axis, FIG. 5 shows influence of the Ti concentration on Young's moduli. It is acknowledged that the Young's modulus has a positive slope with respect to the Ti concentration. Specifically, at least in a condition of combined addition with Y, addition of Ti is effective in increase of the Young's modulus. In particular, addition up to 6 at % is prominently positive in the effect of addition but any greater addition moderates increase of the Young's modulus. Specifically, addition of 6 at % or more Ti is preferable in light of increase of the Young's modulus, and 10 at % or less addition is preferable if saturation of the effect is considered.

Although certain embodiments have been described above, modifications and variations of the embodiments described above will occur to those skilled in the art, in light of the above teachings.

INDUSTRIAL APPLICABILITY

A production method of ceramic matrix composites is provided, which prevents deterioration of reinforcement fibers at high temperatures in a step of melting.

What is claimed is:
1. A production method of a ceramic matrix composite, the method comprising:
   forming a ceramic compact comprising at least one of a reinforcement fiber and a powder, each comprising SiC;
   attaching an ingot of a ternary or more multicomponent Si alloy comprising Y onto the ceramic compact; and
   infiltrating the alloy into the ceramic compact by heating up to a temperature at which the alloy melts, wherein the Si alloy comprises 2 at % to 30 at % of Y and 2 at % to 15 at % of Ti or Hf.

2. The production method of claim 1, wherein the Si alloy consists essentially of:
2 at % to 18 at % of Y;
2 at % to 15 at % of Ti or Hf and the balance Si.

3. The production method of claim 1, wherein a content of Y in the Si alloy is from 2 at % to 6 at %.

4. The production method of claim 1, wherein a content of Ti in the Si alloy is from 6 at % to 10 at %.

5. The production method of claim 1, further comprising:
prior to the step of attaching the ingot, infiltrating a powder of any one or more of SiC and C into the ceramic compact.

* * * * *